United States Patent

[11] 3,619,229

[72] Inventor Robert C. Hartlein
       Midland, Mich.
[21] Appl. No. 757,749
[22] Filed Sept. 5, 1968
[45] Patented Nov. 9, 1971
[73] Assignee Dow Corning Corporation
       Midland, Mich.

[54] REINFORCED POLYSTYRENE AND ITS COPOLYMERS
10 Claims, No Drawings

[52] U.S. Cl................................................ 117/4,
       117/72, 117/76 T, 117/126 GS
[51] Int. Cl........................................... C03c 25/02
[50] Field of Search........................................ 117/4, 126
       GS, 72, 76 T; 161/93

[56] References Cited
UNITED STATES PATENTS

| | | | |
|---|---|---|---|
| 2,877,501 | 3/1959 | Bradt | 117/4 |
| 3,252,278 | 5/1966 | Marzocchi et al. | 117/126 GS |
| 3,403,069 | 8/1968 | Benson | 117/4 |
| 3,444,119 | 5/1969 | LeBlanc | 117/126 GS |
| 3,441,466 | 7/1969 | Sterman | 117/126 GS |
| 3,455,725 | 7/1969 | Jex | 117/126 GS |
| 3,472,729 | 10/1969 | Sterman | 117/126 GS |
| 3,367,793 | 2/1968 | Atwell | 117/126 |

Primary Examiner—Alfred L. Leavitt
Assistant Examiner—M. F. Esposito
Attorneys—Robert F. Fleming, Jr., Laurence R. Hobey and Harry D. Dingman ABSTRACT: Polystyrene and copolymers thereof can be reinforced by glass fibers having a coating of silane coupling agent and a thermosetting polymer such as epoxy, phenolic, polyester, polyacrylate and melamine, to provide superior thermoplastic injection molding compositions.

REINFORCED POLYSTYRENE AND ITS COPOLYMERS

SPECIFICATION

This invention relates to a method for making improved thermoplastic compositions by the use of thermosetting resins as sizing for glass fibers. In particular, this invention relates to a novel method for producing reinforced thermoplastic molding compounds of polystyrene and its copolymers and mixtures of copolymers. Additionally, the invention relates to composite articles of the described resins and glass fibers.

It has been sought by workers in the organic polymer field to enhance the physical properties and strengthen certain inexpensive and commercially available thermoplastics such as polystyrene by employing glass fibers. Since polystyrene monomers consist of $-CH_2C_6H_5CH_2-0$ the polymer is generally nonreactive. This characteristic of polystyrene poses a coupling problem in that the thermoplastic fails to adhere to surfaces of glass fibers. As a result of the poor bonding between treated glass fibers and the thermoplastic material, the contribution of strength is less than could otherwise be achieved. The invention provides improved bonding by the proper selection of a combination of the defined thermosetting resins and silane coupling agents as a precoating for the glass fibers.

A second problem involves uniformity of distribution of the glass fibers throughout the molded article. Of the several ways to mix glass and thermoplastic resins one of the most economical is to dry blend the glass fibers and the resin. However, unless the dry blend is homogeneous, a nonuniform distribution of glass is obtained when the blend is fed to the melt cylinder and from there to the mold. This results in lower strength articles. The process of this invention has solved this problem because the individual fibers stay in bundles during chopping and blending and thus do not form fuzz and segregate from the particles of styrene. However, the fibers are not so tightly bound that they will not separate during extrusion of the thermoplastic-glass mixture into the mold. Thus, a uniform mix of individual fibers is obtained in the final product. It is important to note that this uniform blend can be obtained with polystyrene pellets. This eliminates the necessity of grinding the resin to a fine powder and results in considerable savings.

A third problem has to do with the integrity of the glass fiber during the molding and mixing operation. Unless the fibers are adequately protected from abrasion they will disintegrate and loose their reinforcing ability. The coating employed herein gives excellent protection to the glass.

It is an object of this invention to produce a method for improving the contribution of strength of treated glass fibers in polystyrene and copolymers thereof. It is another object of this invention to produce a novel method of reinforcing thermoplastics to obtain optimum strength and reinforcement. It is a further object of this invention to provide a novel composite blend that can be readily molded into a thermoplastic article of marked rigidity and increased stability over that obtained using untreated materials. It is a further object to provide a novel treated glass roving with improved handling properties. Other objects and advantages will be apparent from the following description.

According to the invention, there is provided a method of making a thermoplastic molding compound which comprises 1. coating glass fibers with a
   A. an organosilane having attached to the silicon through a silicon-carbon bond at least one functional group reactive with a thermosetting resin selected from the group consisting of aromatic epoxy, phenolic, polyester, polyacrylate and melamine resins, at a temperature below the decomposition temperature of the resin, (A) having at least two hydrolyzable groups attached to the silicon or hydrolysis products of (A).
   B. a thermosetting resin selected from the group consisting of aromatic epoxy, phenolic, polyester, polyacrylate and melamine resins, (B) being present in amounts such that the weight pickup of said thermosetting resin on the glass is from 0.25 percent to 15 percent by weight based on the weight of the glass,
2. bringing the thermosetting resin to such a state that the coated fibers can be chopped without sticking to the chopper,
3. chopping said fibers, and thereafter
4. curing the resin coating and
5. blending sufficient polystyrene or copolymers thereof with said treated glass fibers whereby a blend of glass fibers and polystyrene is obtained having the bulk density of approximately the bulk density of polystyrene.

The term "polystyrene" as used herein includes polystyrene per se and copolymers of styrene and other vinylic monomers containing at least 50 mol percent.

In accordance with the best mode of practicing of this invention, glass roving is passed through a bath containing the above-described organosilane. After being dried it is then passed through a second bath containing above-described thermosetting resin which has been precatalyzed. The roving so treated is then dried at a low-temperature to reach a tacky state just prior to and during the chopping operation. By this method frizzing is prevented. Thereafter, the chopped materials are fully cured and mixed with the polystyrene.

It is, of course, understood that a one-bath system can be employed in that a solution of the silane, or its hydrolyzate and thermosetting resin can be applied in a single operation. Thus, the silane coupling agent may be mixed with the thermosetting resin, cured to a tacky state, chopped, fully cured and mixed with the polystyrene. Hence, the treatment of glass fibers according to this invention produces a composite wherein the glass-thermoset interface is substantially united chemically and the thermoset-thermoplastic interface is substantially bonded nonchemically.

In order to enhance the handling and chopping properties of roving, glass fiber manufacturers presently add certain silanes to their glass sizings. Because of film hardness, choppability is generally impaired. The method of this invention produces glass roving that is easy to handle and chop due to the slight adhesion achieved by maintaining a tacky state prior to the chopping operation. Thus, it is extremely important that the glass be chopped while the thermosetting resin is in its uncured state since the coating is soft and flexible and no balling or frizzing of the fibers results. In addition, markedly improved processing characteristics may be obtained by this invention. Because the bulk density of the chopped fibers approximates that of the thermoplastic material, dry blends thereof can be readily molded to yield a uniform dispersion of coated glass fibers in a thermoplastic matrix.

Any commercial type of glass fiber can be used in this invention. The term glass fibers indicates glass rovings, yarns, milled fibers, strands, bundles or fabric used to give reinforcement to the thermoplastic material. Generally, as the length to diameter of the glass fiber increases the reinforcing effect becomes more pronounced. Thus, chopped glass fibers having about one-fourth inch length are generally preferable.

Silane or siloxane coupling agents serve to bond glass to an organic thermosetting polymer. In effect, a strong bonding relationship is formed between the hydrophilic end of the coupling agent with the glass substrate and a likewise strong bonding relationship is formed at the other end of the coupling agent with the thermosetting substance. Thus, the coupling agent functions as a molecular bridge which serves to tie the organic polymer coating with the hydroxyl-containing glass substrate.

The coupling agents used herein are well known materials and have been described in various U.S. Pat. Nos. and publications such as U.S. Pat. Nos. 3,306,800, 3,249,464, 3,079,361 and 2,946,701; and articles by E. P. Plueddemann et al. in Modern Plastics, Vol. 39, pg. 135, Aug. 1962, and Vol. 40, pg. 133, June 1963, which disclosures are incorporated herein by reference.

For the purpose of this invention the coupling agent can be any silane having a functional group attached to the silicon through a silicon-carbon bond and having two or three hydrolyzable groups attached to the silicon atom or hydrolyzates of such silanes. Thus, the coupling agent can be a silane, a silanol or a siloxane.

As used in this specification "hydrolyzable group," is defined as those silicon-bonded radicals which are replaced by water at substantially room temperature to form a silanol radical, i.e. Si–OH. Such groups are well known to the art, representative examples being alkoxy groups, such as methoxy, ethoxy, allyloxy, $\beta$-methoxyethoxy, and isopropoxy; acyloxy groups such as acetate, propionate, butyrate; halogen groups such as chloride, bromide, and iodide; ketoxime such as

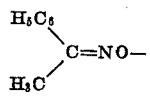

$(CH_3)_2 = C = NO-$, and the isocyanate group.

In selecting a coupling agent, particular attention must be paid to the organic portion of said agent. It should be realized that the nature of the linkage between the siliconorganic functional portion of the coupling agent is immaterial so long as it is stable; that is, so long as it is free of hydrolyzable linkages such as silicon-oxygen, silicon-nitrogen, etc., which render any group containing them unstable. In short, the silicon of the coupling agent must be linked to the reactive organic portion of the coupling agent through silicon-carbon linkage. Again, the linking group can contain other atoms such as O, S, N, etc., so long as they are not attached directly to a silicon atom. Thus, the organic functional portion can be, for example, of the group consisting of 1,2-epoxy, amino, imino, vinyl, vinylene, vinylidene, aliphatic halogen, isocyanato, mercapto, hydroxyl, carbonyl and carboxyl.

One cardinal feature of the present invention is that the glass fibers coated with the appropriate coupling agent are chemically receptive to certain thermosetting resins in that a substantial bonding is obtained between the thermoset and the coated fibers. Presumably, this is due to an interaction between the thermosetting resin and the organic portion of said agent, however, this invention is in no way restricted to such an explanation. In any event it is generally true that best bonding is obtained using those organosilicon compounds in which the organic functional group is reactive with a functional group in the thermosetting resin. Thus, by way of example, the following table matches the thermosetting resin with the best known type of coupling agent for the resin.

reactants forming the resin contains an aromatic ring. These materials are commercially available. Low molecular weight epoxy resins derived from bisphenol A and epichlorohydrin answer well to the present invention. The polymers can be cured with a catalyst such as tertiary amines or they can be crosslinked with a variety of hardeners. In addition, the epoxy resins may be modified with phenolic (novolak), acrylic or some other thermosetting resin. In short, any aromatic epoxy resins cured with any of the common catalyst and/or crosslinkers is operative herein.

Both the base catalyzed or resol and the acid catalyzed or novolak phenolic resins (phenolaldehyde) can be satisfactorily used in the present invention. In addition, the phenolic resins may be modified with epoxy or other thermosetting resins without departing from the present invention.

The term polyester is used herein to refer to polymers made from di- or polyfunctional alcohols and di- or polyfunctional acids. These include polyesters containing aliphatic C=C. Thus, the polyester can be based on saturated alcohols and unsaturated acids such as maleic or fumaric acids or anhydrides or unsaturated alcohols such as allyl alcohol. The latter would include allyl phthalates. The term also includes the so-called alkyl resins which are reaction products of polyhydric alcohols and dibasic acids and which do not include C=C aliphatic unsaturation. If desired, the polyesters can be modified by including therein vinylic monomers such as styrene or they can be modified with drying oil acids.

The polyacrylic esters used herein are polymers of the esters of acrylic and methacrylic acids. These resins are rendered thermosetting by including polyfunctional monomers in the copolymer such as hydroxypropylmethacrylate, diacrylyl, glycolate, glycidoxypropyl acrylate and other monomers well known in the art.

The melamine-formaldehyde resins can also be used as the thermosetting coating. These materials are well-known and any type of melamine formaldehyde resin can be used.

Aside from providing a surface to which the thermoplastic will adhere, one principal function of the thermosetting resin is to protect the glass fiber integrity during fabricating and processing. Manifestly, when the thermosetting resin is primed to the glass surface it gives increased rigidity to the glass fibers in that there is a minimum of fiber rupture or glass filament damage during subsequent milling or extrusion. Thus, when the cured material is blended with a thermoplastic resin the glass fiber integrity remains intact, in that there is a minimum of breakage or damage, and there is no substantial removal of the thermoset's protective coating.

RESIN WITH APPROPRIATE COUPLING AGENT

| Thermosetting resins | Organic function of coupling agent | Example of coupling agent |
|---|---|---|
| Epoxy | 1,2 epoxy amino | $H_2C \overset{O}{\underset{H}{-}} C-CH_2O(CH_2)_3Si(OCH_3)_3$ |
| Phenolic novolack resol | Amino 1,2 epoxy | $N_2H(CH_2)_2NH(CH_2)_3Si(OCH_3)_3$ |
| Polyester | Vinylic 1,2 epoxy vinylene | $CH_2=C(CH_3)COO(CH_2)_3Si(OCH_3)_3$ |
| Polyacrylate | Vinyl 1,2 epoxy | $CH_2=CHSi(OOCCH_3)_3$ |
| Melamine | Chloroalkyl 1, 2 epoxy | $Cl(CH_2)_3Si(OCH_3)_3$ |

The organosilicon coupling agent may be applied by various conventional means: roller, spray or flow methods or by immersing the glass strands in a bath of treating composition. The treated fibers can be allowed to air dry or drying can be accelerated by heat.

It will be appreciated that there are a number of thermosetting resins which are appropriately suited for the coating process (1) of this invention. Although outstanding improvement is obtained by employing aromatic epoxy or phenolic resins with the proper coupling agent, other thermosetting resins can also afford very satisfactory results. Suitable polymers include polyacrylate, polyester (including diallylesters of polybasic acids), and melamine materials in addition to phenolic and epoxy resins.

Aromatic epoxy resins are those in which at least one of the

The thermoplastic that can be reinforced by this invention is polystyrene and its copolymers. Polystyrene is formed from the addition polymerization of styrene. In order to be an effective thermoplastic material reinforced to achieve optimum strength and excellent molding and extrusion properties, the styrene concentration in the copolymer should be at least 50 mol percent and preferably from 70 to 80 mol percent. Any copolymer of styrene and other vinylic monomers can be used herein. The other monomers include alpha-methylstyrene, acrylonitrile, methylmethacrylate, ethylacrylate, vinyltoluene and butadiene.

In order to attain appreciable reinforcement, at least 10 percent glass fiber by weight should be present in the blend of fibers and thermoplastic and preferably at least 25 percent, although these proportions are not critical.

A typical composite concentration would be:

| | |
|---|---|
| Thermoplastic | 75 percent |
| Glass fiber | 24 percent |
| Thermoset | 0.9 percent |
| Coupling agent | 0.1 percent |

The following examples are illustrative only and should not be construed as limiting the invention which is properly delineated in the appended claims.

EXAMPLE 1

Using a two bath system, glass strands were first dipped into an aqueous solution of 0.5 percent γ-glycidoxypropyltrimethoxysilane with 0.1 percent acetic acid and dried. The treated strands were passed through a second bath consisting of 200 g. acetone and 1,680 g. toluene into which 60 g. epoxy novalac (DEN 431, Dow Chemical Co.) and 60 g. nadic methyl anhydride with 0.6 g. benzyldimethylamine were dissolved. The amount of the coating applied did not exceed 15 percent by weight of the glass. When the strands were in a tacky or sticky state they were chopped and then cured for 2 hours at 350° F. For injection molding, 35 percent by weight of glass coated with the cured material was dry blended with 65 percent by weight of a commercial styreneacrylonitrile copolymer. In testing samples thus produced, the tensile strength was 12,750 p.s.i. and the flexural strength was 24,600 p.s.i.

EXAMPLE 2

Using a one-bath system, glass strands were passed through a solution consisting of 60 g. epoxy novalac, 60 g. nadic methyl anhydride, 0.6 g. benzyl dimethylamine, 20 g. γ-glycidoxypropyltrimethoxysilane in 1,860 g. of toluene. While the glass strands were still tacky they were chopped and subsequently cured for 2 hours at 250° F. A 35 percent by weight of the cured material was dry blended with 65 percent commercial styrene acylonitrile copolymer. After injection molding, samples had a tensile strength of 14,730 p.s.i. and a flexural strength of 26,350 p.s.i.

EXAMPLE 3

A commercial fiber glass which was pretreated at the bushing with a hydrolyzate gamma-glycidoxypropyltrimethoxysilane, and was employed as in example 1. The resulting coated glass fibers in the amount of 35 percent by weight was dry blended with 65 percent commercial styrene-acrylonitrile copolymer. A second sample was also made using polystyrene instead of the named copolymer. The flexural strength for the first same was 23,850 p.s.i. and 21,975 p.s.i. for the second.

EXAMPLE 4

Using a two-bath system glass strands were first treated with an aqueous solution of 10 g. gamma-glycidoxypropyltrimethoxysilane and 0.1 percent acetic acid and subsequently dried. The coated strands were then passed through a second bath consisting of 15 g. Shell Chemical's Epon 828, an epichlorohydrinbisphenol A type epoxy resin, with 31 g. curing agent, an aromatic amine, in 200 g. acetone and 2,113 g. toluene. The amount of coating on the glass did not exceed 15 percent by weight of the glass. When the strands were still in a tacky or sticky state they were chopped into one-fourth inch lengths and cured for 45 minutes at 300° F. For injection molding 35 percent by weight cured material was dry blended with 65 percent polystyrene. Samples from this composition produced a material that had a tensile strength of 13,250 p.s.i. and a flexural strength of 19,600 p.s.i.

EXAMPLE 5

Glass strands are passed through a coupling bath having 0.5 percent γ-glycidoxypropyltrimethoxysilane and 0.1 percent acetic acid and dried. The strands were then passed through a thermosetting bath made up of 100 g. epoxy novalac (DEN 431, Dow Chemical Co.), 100 g. nadic methyl anhydride, 1 g. benzyl dimethylamine, in 200 g. acetone and 2,099 g. toluene. The amount of coating applied did not exceed 15 percent by weight of glass. When the treated strands were in a tacky or sticky state they were chopped and then the coating was further cured for 60 min. at 400° F. For injection molding 35 percent by weight of the cured, chopped material was dry blended with 65 percent copolymer of styrene-acrylonitrile.

Samples from this example had a tensile strength of 20,740 p.s.i. and a flexural strength of 24,900 p.s.i.

EXAMPLE 6

Glass strands were passed through a bath of coupling agent having 0.5 percent glyciodoxypropyltrimethoxysilane with 0.1 percent acetic acid and subsequently dried. The strands were then passed through a bath of 5 percent phenolic resin (ELL 3,085, Union Carbide) in isopropyl alcohol. After being partly cured and while still tacky, the strands were chopped. The treated fibers were then further cured for 30 minutes at 350° F. For molding compositions, 20 percent by weight of the cured and chopped material was dry blended with 80 percent polystyrene. The samples produced by this example gave a tensile strength of 9,380 p.s.i.

EXAMPLE 7

Glass strands were passed through 0.5 percent gamma-glyciodoxypropyltrimethoxysilane and 0.1 percent acetic acid in water and then dried. Thereafter, the strands were passed through a bath made up of 7.5 percent of a commercial thermosetting methylmethacrylate resin containing glycidoxypropylacrylate in toluene. The amount of these coatings did not exceed 15 percent by weight of the glass. When the treated strands were in a tacky or sticky state, they were chopped and then the coated fibers were further cured for 30 minutes at 350° F. For injection molding, 75 percent by weight of polystyrene was blended with 25 percent glass fibers as above treated resulting in a material having a tensile strength of 7,280 p.s.i. In a like manner 75 percent by weight of styrene-acrylonitrile was blended with 25 percent glass fibers as treated above, yielding a tensile strength of 9,610 p.s.i.

That which is claimed is:

1. A glass-reinforced thermoplastic composite consisting essentially of
   1. a thermoplastic resin selected from the group consisting of polystyrene and copolymers of polystyrene containing at least 50 mole percent polystyrene, and blended therein
   2. glass fibers coated with (a) an organosilicon coupling agent having an organofunctional substituent, selected from the group consisting of epoxy, amino, imino, vinyl, vinylene, vinylidene, aliphatic halogen, isocyanato mercapto, carbonyl, carboxyl and hydroxyl radicals said radical being attached to the silicon atom through a silicon-carbon linkage, and (b) a thermosetting resin selected from the group consisting of aromatic epoxy resins, polyesters, polyacrylates and melamines; said resin being reactive with the organofunctional substituent of the coupling agent (a) at a temperature below the decomposition temperature of the thermoplastic resin.

2. The composite of claim 1 containing at least 10 weight percent of glass fibers.

3. An article in accordance with claim 1 in which the coupling agent (a) is $CH_2=CHCH_2O(CH_2)_3Si(OCH_3)_3$, and the thermosetting resin (b) is an aromatic epoxy and the thermoplastic resin is polystyrene.

4. An article in accordance with claim 1 in which the thermosetting resin (b) is phenolic.

5. An article in accordance with claim 1 in which the coupling agent (a) is $H_2N(CH_2)_2NH(CH_2)_3Si(OCH_3)_3$.

6. A method of making a thermoplastic molding compound which comprises 1. coating glass fibers with
   a. an organosilane having attached to the silicon through a silicon-carbon bond at least one functional group selected from the group consisting of epoxy, amino, imino, vinyl, vinylene, vinylidine, aliphatic halogen, isocyanato, mercapto, carbonyl, carboxyl, and hydroxyl radicals, said organosilanes having at least two hydrolyzable groups attached to the silicon or hydrolysis products of said organosilane b. a thermosetting resin selected from the group consisting of aromatic epoxy, phenolic, polyester, polyacrylate and melamine, said thermosetting resin being present in amounts such that the weight pickup of said thermosetting resin on the glass is from 0.25 to 15 percent by weight based on the weight of the glass, said thermosetting resin being reactive with the functional group of organosilane (a) at a temperature below the decomposition temperature of the thermosetting resin.

2. bringing the thermosetting resin to such a state that the coated fibers can be chopped without sticking to the chopper, 3. chopping said fibers, and thereafter 4. curing the resin coating; and 5. blending sufficient polystyrene or copolymers thereof with said treated glass fibers whereby a blend of glass fibers and polystyrene is obtained having a bulk density approximating the bulk density of the polystyrene.

7. The method of claim 6 wherein 5 is a copolymer of styrene and acrylonitrile.

8. The method of claim 6 wherein 5 is polystyrene.

9. The method of claim 6 wherein process 1 is accomplished by concurrently coating (a) and (b) on a glass surface.

10. The method of claim 6 wherein the thermosetting resin (b) is an aromatic 1,2-epoxy resin.

* * * * *